(12) United States Patent
Helton et al.

(10) Patent No.: US 8,865,261 B2
(45) Date of Patent: Oct. 21, 2014

(54) EXTRUSION COATING OF ELONGATED SUBSTRATES

(71) Applicant: Eastman Chemical Company, Kingsport, TN (US)

(72) Inventors: Tony Wayne Helton, Kingsport, TN (US); Steven Lee Stafford, Gray, TN (US); Aaron Grills, Kingsport, TN (US); Subramanian Easwaran Iyer, Blountville, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/706,408

(22) Filed: Dec. 6, 2012

(65) Prior Publication Data

US 2014/0162015 A1 Jun. 12, 2014

(51) Int. Cl.
| | |
|---|---|
| *B05D 3/12* | (2006.01) |
| *B05C 11/02* | (2006.01) |
| *B05C 3/02* | (2006.01) |
| *B05D 1/26* | (2006.01) |
| *B29C 47/02* | (2006.01) |
| *B29C 47/88* | (2006.01) |
| *B29C 47/90* | (2006.01) |
| *B29C 47/00* | (2006.01) |
| *B29C 47/08* | (2006.01) |

(52) U.S. Cl.
CPC .............. *B05D 1/265* (2013.01); *B29C 47/021* (2013.01); *B29C 47/025* (2013.01); *B29C 47/8815* (2013.01); *B29C 47/908* (2013.01); *B29C 47/0023* (2013.01); *B29C 47/0028* (2013.01); *B29C 47/003* (2013.01); *B29C 47/0852* (2013.01); *B29C 47/903* (2013.01); *B29C 47/904* (2013.01)
USPC ............ 427/356; 427/358; 118/125; 118/404

(58) Field of Classification Search
USPC ......................................................... 427/355
See application file for complete search history.

(56) References Cited

U.S. PATENT DOCUMENTS

| | | | |
|---|---|---|---|
| 2,991,273 | A | 7/1961 | Hechelhammer et al. |
| 2,999,835 | A | 9/1961 | Goldberg |

(Continued)

FOREIGN PATENT DOCUMENTS

| | | |
|---|---|---|
| CA | 2133696 A1 | 5/1995 |
| DE | 9316759 U1 | 2/1994 |

(Continued)

OTHER PUBLICATIONS

December, Timothy S., et al.; "The Effects of TPO Composition on Adhesion and Proposed Chemical Mechanism"; Paint and Coatings Industry; Mar. 2008; www.pcimag.com; pp. 76-82.

(Continued)

*Primary Examiner* — Dah-Wei D Yuan
*Assistant Examiner* — Kristen A Dagenais
(74) *Attorney, Agent, or Firm* — Louis N. Moreno

(57) ABSTRACT

The present disclosure relates to extrusion coating systems, extrusion coated substrates, and processes for making the same. In some aspects, extrusion coating systems as described herein may include an at least partially insulated outlet wall, which may facilitate production of coated substrates exhibiting a very desirable surface texture and appearance. Coated substrates of the present invention may be utilized in a variety of end applications, including, but not limited to, interior and exterior construction materials for homes, buildings, and furniture.

23 Claims, 9 Drawing Sheets

(56) References Cited

U.S. PATENT DOCUMENTS

| | | | |
|---|---|---|---|
| 2,999,846 A | 9/1961 | Schnell et al. | |
| 3,028,365 A | 4/1962 | Schnell et al. | |
| 3,084,662 A | 4/1963 | Badger et al. | |
| 3,148,172 A | 9/1964 | Fox | |
| 3,153,008 A | 10/1964 | Fox | |
| 3,169,121 A | 2/1965 | Goldberg | |
| 3,207,814 A | 9/1965 | Goldberg | |
| 3,271,367 A | 9/1966 | Schnell et al. | |
| 3,599,286 A * | 8/1971 | Karet | 425/464 |
| 3,694,538 A | 9/1972 | Okamoto et al. | |
| 3,772,405 A | 11/1973 | Hamb | |
| 3,853,462 A | 12/1974 | Smith | |
| 3,941,904 A | 3/1976 | Hoh et al. | |
| 4,000,219 A | 12/1976 | Smejkal | |
| 4,123,436 A | 10/1978 | Holub et al. | |
| 4,124,574 A | 11/1978 | Preston et al. | |
| 4,143,187 A | 3/1979 | Pilgrim et al. | |
| 4,156,069 A | 5/1979 | Prevorsek et al. | |
| 4,190,686 A | 2/1980 | Muis | |
| 4,197,038 A | 4/1980 | Hipp et al. | |
| 4,209,475 A * | 6/1980 | Herrington et al. | 264/40.1 |
| 4,397,986 A | 8/1983 | Hornbaker | |
| 4,430,484 A | 2/1984 | Quinn | |
| 4,433,088 A | 2/1984 | Haaf et al. | |
| 4,452,933 A | 6/1984 | McCready | |
| 4,465,820 A | 8/1984 | Miller et al. | |
| 4,558,096 A | 12/1985 | Boon et al. | |
| 4,567,142 A | 1/1986 | Lloyd | |
| 4,613,653 A | 9/1986 | Kitchens et al. | |
| 4,740,556 A | 4/1988 | Abolins et al. | |
| 4,757,110 A | 7/1988 | Sato | |
| 4,760,114 A | 7/1988 | Haaf et al. | |
| 4,775,597 A | 10/1988 | Birkmeyer et al. | |
| 4,935,306 A | 6/1990 | Ohtsuka et al. | |
| 4,981,898 A | 1/1991 | Bassett | |
| 4,982,014 A | 1/1991 | Freitag et al. | |
| 4,987,702 A | 1/1991 | Anschutz | |
| 5,010,162 A | 4/1991 | Serini et al. | |
| 5,084,511 A | 1/1992 | Abe et al. | |
| 5,162,058 A | 11/1992 | Uenaka et al. | |
| 5,166,237 A | 11/1992 | Abe et al. | |
| 5,286,547 A | 2/1994 | Tyerman | |
| 5,288,559 A | 2/1994 | Oka et al. | |
| 5,312,863 A | 5/1994 | Van Rheenen et al. | |
| 5,382,401 A | 1/1995 | Pickett et al. | |
| 5,415,943 A | 5/1995 | Groger et al. | |
| 5,484,632 A | 1/1996 | Mercer, Jr. et al. | |
| 5,654,347 A | 8/1997 | Khemani et al. | |
| 5,674,928 A | 10/1997 | Chisholm et al. | |
| 5,696,176 A | 12/1997 | Khemani et al. | |
| 5,725,944 A | 3/1998 | Jones et al. | |
| 5,824,373 A | 10/1998 | Biller et al. | |
| 5,898,043 A | 4/1999 | Uemae et al. | |
| 5,907,006 A | 5/1999 | Rennie et al. | |
| 5,914,083 A | 6/1999 | Yada et al. | |
| 5,925,698 A | 7/1999 | Steckel | |
| 5,962,573 A | 10/1999 | Berta | |
| 5,972,471 A | 10/1999 | Jasenof et al. | |
| 5,976,676 A | 11/1999 | Miki et al. | |
| 5,985,397 A | 11/1999 | Witt et al. | |
| 5,997,456 A | 12/1999 | Butters et al. | |
| 6,020,414 A | 2/2000 | Nelson et al. | |
| 6,074,727 A | 6/2000 | Miller et al. | |
| 6,083,601 A | 7/2000 | Prince et al. | |
| 6,093,773 A | 7/2000 | Evans et al. | |
| 6,114,021 A | 9/2000 | Pankratz | |
| 6,153,264 A | 11/2000 | Schmid et al. | |
| 6,203,915 B1 | 3/2001 | Prissok et al. | |
| 6,206,965 B1 | 3/2001 | Rao et al. | |
| 6,306,507 B1 | 10/2001 | Brunelle et al. | |
| 6,352,784 B1 | 3/2002 | Katagiri | |
| 6,353,050 B1 | 3/2002 | Bastiaens et al. | |
| 6,391,461 B1 | 5/2002 | Ryntz et al. | |
| 6,394,784 B1 * | 5/2002 | Gellert et al. | 425/549 |
| 6,448,328 B1 | 9/2002 | Kappler et al. | |
| 6,455,161 B1 | 9/2002 | Regnier et al. | |
| 6,461,792 B1 | 10/2002 | Kawamura et al. | |
| 6,500,895 B1 | 12/2002 | Bastiaens et al. | |
| 6,540,624 B1 | 4/2003 | Isogawa | |
| 6,576,309 B2 | 6/2003 | Dalgewicz, III et al. | |
| 6,579,611 B1 | 6/2003 | Iwashita et al. | |
| 6,583,189 B1 | 6/2003 | King | |
| 6,584,743 B2 | 7/2003 | Paxton et al. | |
| 6,596,784 B1 | 7/2003 | King | |
| 6,601,357 B2 | 8/2003 | Tunis | |
| 6,616,998 B2 | 9/2003 | Greer et al. | |
| 6,660,086 B1 | 12/2003 | Prince et al. | |
| 6,667,367 B1 | 12/2003 | Berta | |
| 6,680,104 B2 | 1/2004 | Boris et al. | |
| 6,716,522 B2 | 4/2004 | Matsumoto et al. | |
| 6,852,765 B2 | 2/2005 | Decker et al. | |
| 6,933,043 B1 | 8/2005 | Son et al. | |
| 6,994,752 B2 * | 2/2006 | Estrada et al. | 118/125 |
| 7,022,768 B1 | 4/2006 | Lacroix et al. | |
| 7,081,488 B2 | 7/2006 | Bardman et al. | |
| 7,097,879 B2 | 8/2006 | Bolton et al. | |
| 7,160,977 B2 | 1/2007 | Hale et al. | |
| 7,175,905 B2 | 2/2007 | Curtis et al. | |
| 7,226,985 B2 | 6/2007 | Hale et al. | |
| 7,318,958 B2 | 1/2008 | Wang | |
| 7,335,399 B2 | 2/2008 | Bolton et al. | |
| 7,368,511 B2 | 5/2008 | Hale et al. | |
| 7,374,795 B2 | 5/2008 | Prince et al. | |
| 7,694,468 B2 | 4/2010 | Prince et al. | |
| 8,071,198 B2 | 12/2011 | Michalczyk et al. | |
| 8,071,695 B2 | 12/2011 | Strand et al. | |
| 8,113,143 B2 | 2/2012 | Prince et al. | |
| 8,197,733 B2 | 6/2012 | Sudano | |
| 8,394,784 B2 | 3/2013 | Stroumpoulis et al. | |
| 8,734,909 B2 | 5/2014 | Iyer et al. | |
| 2004/0131871 A1 | 7/2004 | Lee et al. | |
| 2005/0050814 A1 | 3/2005 | Prince et al. | |
| 2005/0102963 A1 | 5/2005 | Nien et al. | |
| 2005/0137356 A1 | 6/2005 | Hale et al. | |
| 2006/0022376 A1 | 2/2006 | Prince et al. | |
| 2006/0111519 A1 | 5/2006 | Strand et al. | |
| 2006/0270806 A1 | 11/2006 | Hale | |
| 2007/0000568 A1 | 1/2007 | Bohme et al. | |
| 2007/0292569 A1 | 12/2007 | Bohme et al. | |
| 2008/0145564 A1 | 6/2008 | Allam et al. | |
| 2009/0011164 A1 | 1/2009 | Masuda et al. | |
| 2009/0035581 A1 | 2/2009 | Sudano | |
| 2009/0036581 A1 | 2/2009 | Joshi et al. | |
| 2010/0003410 A1 | 1/2010 | King et al. | |
| 2010/0021677 A1 | 1/2010 | West et al. | |
| 2011/0223342 A1 * | 9/2011 | Iyer et al. | 427/434.4 |

FOREIGN PATENT DOCUMENTS

| | | |
|---|---|---|
| DE | 44 24 767 C1 | 11/1995 |
| DE | 198 57 045 A1 | 6/2000 |
| EP | 0 132 218 A2 | 1/1985 |
| EP | 0 210 297 A1 | 2/1987 |
| EP | 0 488 711 A2 | 6/1992 |
| EP | 0 510 463 A1 | 10/1992 |
| EP | 653469 A2 | 5/1995 |
| FR | 2 861 738 A1 | 5/2005 |
| GB | 1 397 270 A | 6/1975 |
| GB | 2 024 658 A | 1/1980 |
| JP | S59 155024 A | 9/1984 |
| JP | 1-225647 A | 9/1989 |
| JP | 3-26752 A | 2/1991 |
| JP | 8-34866 A | 2/1996 |
| JP | 08300590 | 11/1996 |
| JP | 9324135 A | 12/1997 |
| JP | 11-90827 A | 4/1999 |
| JP | 11-245590 A | 9/1999 |
| JP | 2002-337291 A | 11/2002 |
| JP | 2003-056168 A | 2/2003 |
| JP | 2004-211039 A | 7/2004 |
| JP | 2005-264136 A | 9/2005 |
| JP | 2006-281544 A | 10/2006 |
| WO | WO 96/18685 A1 | 6/1996 |
| WO | WO 97/46627 A1 | 12/1997 |

(56) References Cited

FOREIGN PATENT DOCUMENTS

| WO | WO 98/27159 A1 | 6/1998 |
|---|---|---|
| WO | WO 01/27200 A3 | 4/2001 |
| WO | WO 2006/093916 A2 | 9/2006 |
| WO | WO 2008/040498 A1 | 4/2008 |

OTHER PUBLICATIONS

Berta, Dominic A.; "Formulating Plastics for Paint Adhesion"; Chapter 3 from Coatings of Polymers and Plastics, 2003, edited by Ryntz, Rose, A. and Yaneff, Phillip V.; pp. 85-119.
ASTM Test Method D 2457.
ASTM D 3359-02.
ASTM D 523.
ASTM E 1164.
ASTM E 308.
"BLENDEX BMAT Data Sheet Styrene Acrylonitrile", http://www.ides.com/info/datasheet/E73798/BLENDEX-BMAT, Sep. 13, 2012.
"Paraloid™ KM-377 Acrylic Impact Modifier", Technical Data Sheet, The Dow Chemical Company.
Notification of Transmittal of the International Search Report and the Written Opinion of the International Searching Authority dated Jan. 22, 2010 for International Application No. PCT/US2009/004107.
Copending U.S. Appl. No. 12/721,080, filed Mar. 10, 2010, Subramanian Iyer et al.
Copending U.S. Appl. No. 12/503,675, filed Jul. 15, 2009, Jeremy Richard Lizotte et al.
Strasser, CFD Investigation of Gear Pump Mixing Using Deforming/Agglomerating Mesh, J. Fluids Eng.—Apr. 2007—vol. 129, Issue 4, 476 (9 pages).
Notification of Transmittal of the International Search Report and the Written Opinion of the International Searching Authority dated Apr. 28, 2011 for International Application No. PCT/US2011/026942.
USPTO Office Action dated Apr. 2, 2012 for copending U.S. Appl. No. 12/503,675.
USPTO Office Action dated May 7, 2012 for copending U.S. Appl. No. 12/721,080.
Copending U.S. Appl. No. 13/616,672, filed Sep. 14, 2012, Jeremy Richard Lizotte et al.
Copending U.S. Appl. No. 13/616,681, filed Sep. 14, 2012, Jeremy Richard Lizotte et al.
USPTO Office Action dated Sep. 13, 2013 in copending U.S. Appl. No. 13/616,681.
Notification of Transmittal of The International Search Report and The Written Opinion of the International Searching Authority, or the Declaration—International Application No. PCT/US2013/072546 with a mailing date of Mar. 11, 2014.
ASTM D3330.
"Blendex BMAT Modifier Resin"; Chemtura; www.chemtura.com; Effective Jun. 4, 2008; (2007).
"Butyl acrylate-methyl methacrylate polymers"; Chemical Book; www.chemicalbook.com; (2008).
"PARALOID KM-377 Impact Modifier"; Material Safety Data Sheet, DOW; Revision Date: Feb. 7, 2004.
Turner, S. R., et al.; "Polyesters Based on 1,4-Cyclohexanedimethanol"; Modern Polyesters: Chemistry and Technology of Polyesters and Copolyesters; (2003); pp. 280-282.
"Chlorocarbons and Chlorohydrocarbons-$C_2$ to Combustion Technology"; Encyclopedia of Chemical Technology; $4^{th}$ Edition, vol. 6, (1993), pp. 620-623.
USPTO Office Action dated Dec. 6, 2012 for copending U.S. Appl. No. 12/503,675.
USPTO Office Action dated Jan. 11, 2013 for copending U.S. Appl. No. 12/721,080.
USPTO Office Action dated Feb. 26, 2013 for copending U.S. Appl. No. 13/616,672.
USPTO Office Action dated Feb. 27, 2013 for copending U.S. Appl. No. 13/616,681.
Copending U.S. Appl. No. 13/861,412, filed Apr. 12, 2013, Gordon L. King.
Notification of Transmittal of the International Search Report and the Written Opinion of the International Searching Authority dated Jul. 18, 2013 for International Application No. PCT/US2013/037957.
USPTO Office Action dated Aug. 23, 2013 in copending U.S. Appl. No. 12/721,080.
Billmeyer, Fred W. Jr.; "Criteria for Polymer Solubility", Textbook of Polymer Science, $3^{rd}$ Edition, (1984), p. 153.
Carraher, Introduction to Polymer Chemistry $3^{rd}$ Edition, CRC Press, Taylor & France Group, Boca Raton FL p. 240 (2013).
USPTO Office Action dated Jan. 6, 2014 in copending U.S. Appl. No. 12/503,675.
Notice of Allowance received in Co-pending U.S. Appl. No. 12/721,080 dated Apr. 10, 2014.
USPTO Office Action dated Jun. 2, 2014 in copending U.S. Appl. No. 13/616,672.

* cited by examiner

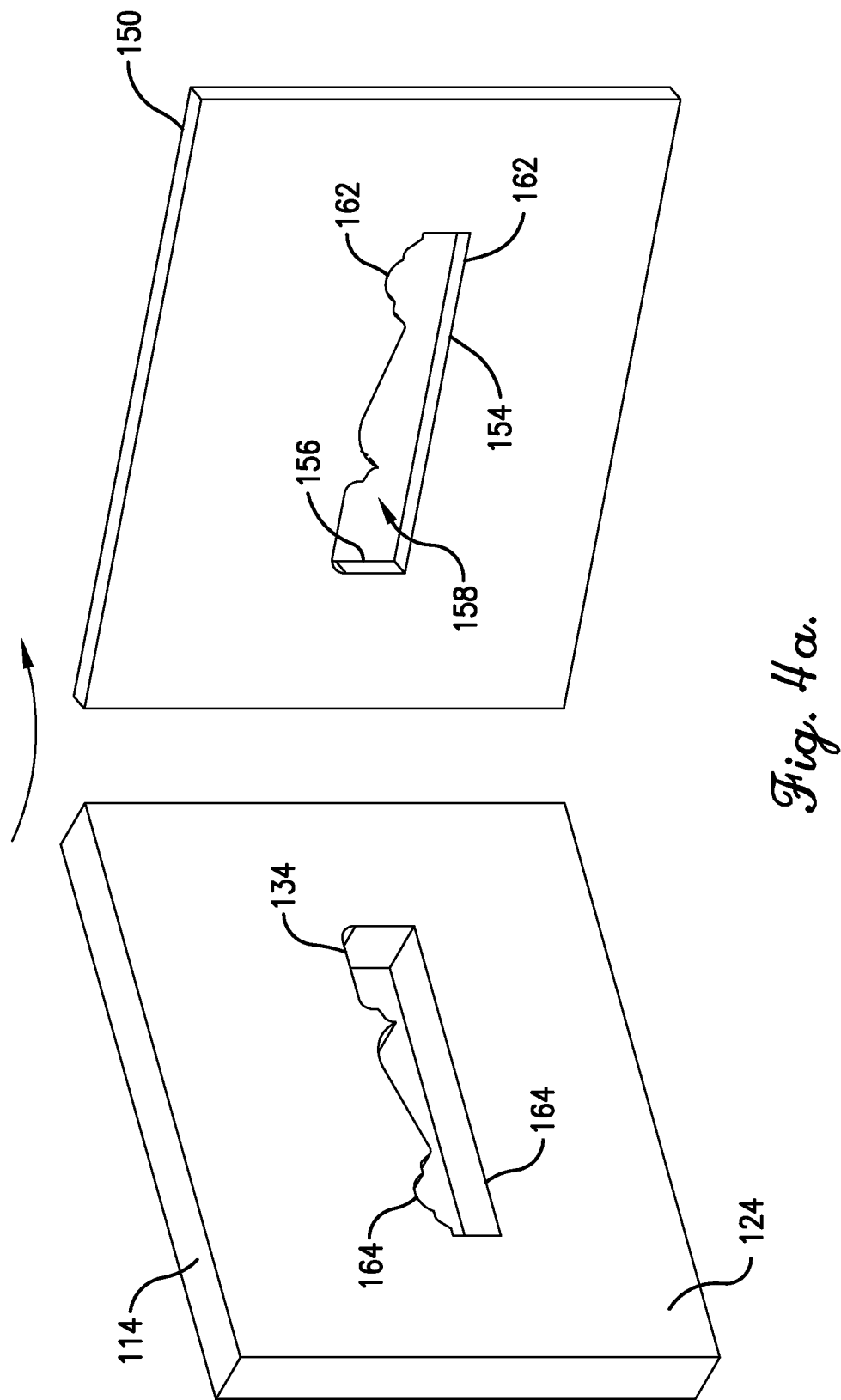

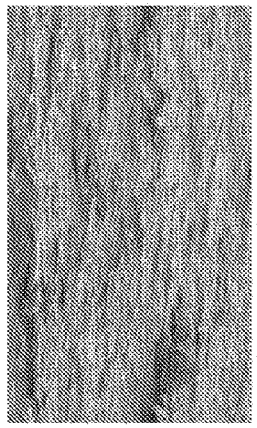
Fig. 6b.
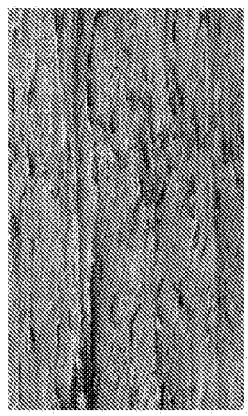
Fig. 6c.
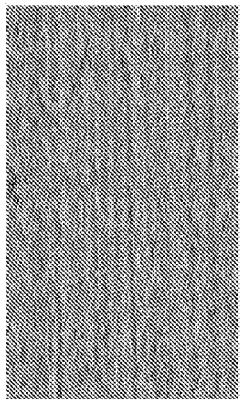
Fig. 6e.
Fig. 6a.
Fig. 6d.

EXTRUSION COATING OF ELONGATED SUBSTRATES

FIELD OF THE INVENTION

This invention relates to processes and systems for coating substrates.

BACKGROUND

Various methods for applying coatings to a substrate are known in the art. One method of coating a substrate includes extrusion coating a substrate with a thermoplastic coating material. Such extrusion coated articles can be useful in a wide variety of applications, including, for example, as interior and exterior construction materials for homes, buildings, and furniture. According to this coating method, a substrate comprising wood, plastic, metal, or other desirable material, is passed through an extruder and a coating material is applied to at least a portion of the surface of the substrate. Once coated, the article is allowed to cool and the final coated substrate preferably exhibits enhanced aesthetic (e.g., gloss and surface smoothness) characteristics.

As the coated substrate exits the coating die and enters the cooling zone, water and other volatile material within the substrate may vaporize, thereby causing undesirable bubbles or blisters in the coating along the surface of the finished product. While at least partially submerging the coated substrate in a quench liquid has been found to help minimize this type of bubbling, quench cooling has also been observed to create a certain surface roughness that degrades the visual acceptability of the final product. Even substrates that show little or no blistering without a quench bath tend to exhibit undesirable surface texture when exposed to a quench liquid cooling bath.

Thus, a need exists for an extrusion coating process and system capable of producing coated substrates that exhibit an acceptable surface texture and appearance. It is also desirable that such a process and system could be economically implemented to existing extrusion coating systems, while minimizing process time and maximizing production rate.

SUMMARY

One embodiment of the present invention concerns a process for coating a substrate. The process comprises the steps of (a) introducing an elongated substrate and a coating material into a die; (b) contacting said substrate with said coating material in said die to thereby provide a coated substrate; (c) removing said coated substrate from said die via a die outlet defined by a die outlet wall of said die; (d) passing said coated substrate removed from said die outlet through a shaped passageway formed in an insulating member affixed to said die outlet wall and having a thermal conductivity less than the thermal conductivity of said die outlet wall; and (e) cooling said coated substrate withdrawn from said insulating member via contact with a quench fluid to thereby provide a cooled coated substrate.

Another embodiment of the present invention concerns a system for applying coating material to a substrate. The system comprises a die for contacting the elongated substrate with the coating material to thereby produce a coated substrate. The die comprises an inlet wall, an outlet wall, and a coating chamber disposed at least partially therebetween. The inlet wall defines a die inlet for receiving said elongated substrate into said die and the outlet wall defines a die outlet for discharging said coated substrate from said die. The system further comprises an insulating member affixed to said outlet wall. The insulating member has a thermal conductivity less than the thermal conductivity of said outlet wall and defines a shaped passageway configured to at least partially surround said die outlet thereby allowing said coated substrate exiting said die outlet to pass through said insulating member. The system also comprises a quench zone located adjacent said insulating member for cooling said coated substrate discharged from said shaped passageway of said insulating member.

Yet another embodiment of the present invention concerns a process for coating an elongated substrate. The process comprises the steps of (a) pushing an elongated substrate into an inlet of an extrusion coating die; (b) passing said elongated substrate through said die along a substantially horizontal die axis; (c) introducing a coating material into said die; (d) during at least a portion of said passing, contacting said substrate with said coating material introduced into said die to thereby provide a coated substrate; (e) removing said coated substrate from said die via a die outlet defined within an outlet wall of the die; and (f) cooling said coated substrate removed from said die outlet via contact with a quench liquid to thereby provide a cooled, coated substrate, wherein said cooled coated substrate has an average $R_{max}$ surface roughness of not more than 30.

Still another embodiment of the present invention concerns a coated article comprising an elongated substrate; and a thermoplastic resin coating extrusion coated onto said substrate. The coated article is a water-quenched article that has not been subjected to a post-quench treatment step and has an average $R_{max}$ surface roughness of not more than 30.

BRIEF DESCRIPTION OF THE DRAWINGS

Various embodiments of the present invention are described in detail below with reference to the attached drawing figures, wherein:

FIG. 6*a* is a scanning electron microscope (SEM) image taken along a portion of the surface of the substrate coated in Example 34 at a magnification of 250 times (250×);

FIG. 6*b* is an SEM image taken along a portion of the surface of the substrate coated in Example 35 at a magnification of 250×;

FIG. 6c is an SEM image taken along a portion of the surface of the substrate coated in Example 37 at a magnification of 250×;

FIG. 6d is an SEM image taken along a portion of the surface of the substrate coated in Example 39 at a magnification of 250×;

FIG. 6e is an SEM image taken along a portion of the surface of the substrate coated in Example 41 at a magnification of 250×;

DETAILED DESCRIPTION

Figure 1:
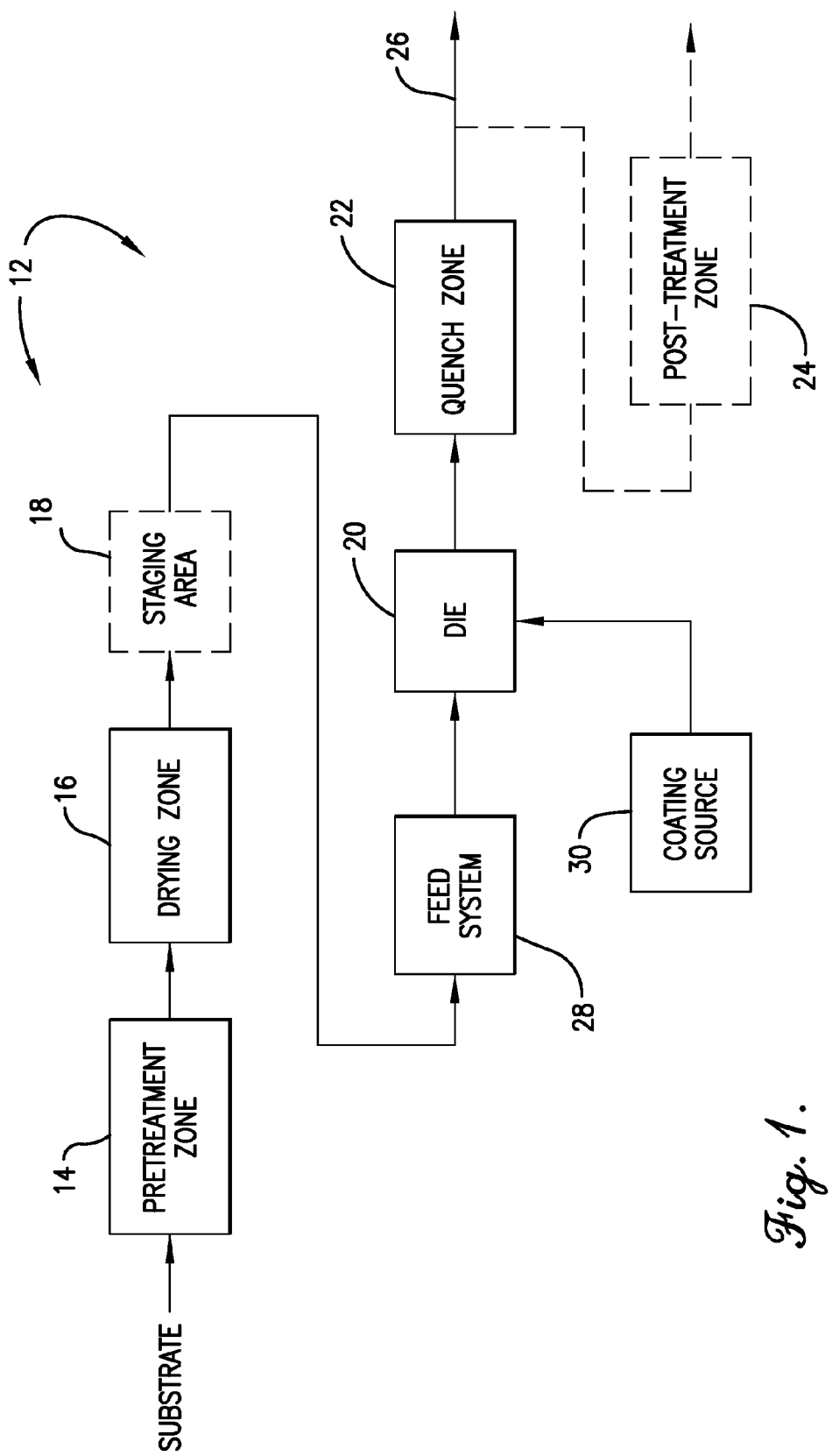
FIG. 1 is a process flow diagram of a coating system configured according to one embodiment of the present invention.

Processes and systems configured according to embodiments of the present invention may be useful for applying a coating material to at least a portion of a substrate. In some embodiments, processes and systems described herein may be useful for extrusion coating a polymeric material onto an elongated substrate to thereby provide an extrusion-coated substrate having an acceptable visual appearance. In particular, the coated substrate may exhibit a substantially bubble-free and non-textured surface, a combination which has heretofore been difficult to achieve using conventional coating methods. Coated substrates produced according to various embodiments of the present invention can be utilized for a variety of applications. In one embodiment, coated substrates or articles may be selected from the group consisting of interior and exterior construction materials, including, but not limited to, door jambs, window jambs, other door or window parts, flat panel shelving, pultrusion articles, exterior molding, exterior trim, and interior or exterior siding. Additional details regarding embodiments of the present invention will now be discussed in detail, with reference to the drawing figures.

Referring initially to FIG. 1, a schematic flow diagram of a coating system 12 configured according to one embodiment of the present invention is provided. Coating system 12 includes a pretreatment zone 14, a drying zone 16, an optional staging area 18, a die 20, a quench zone 22, and an optional post treatment zone 24. As shown in FIG. 1, a substrate can be sequentially passed through pretreatment zone 14, drying zone 16, and optional staging area 18 before being introduced into die 20. Die 20 is configured to facilitate contact between at least a portion of the surface of the substrate and a coating material introduced into die 20 from a coating source 30. The resulting coated article is cooled in quench zone 22 before being optionally treated in a post treatment zone 24. If not further processed in post-treatment in zone 24, the cooled, coated substrate may simply be removed from coating system 12, as indicated by line 26.

Coating system 12 can be configured to process any substrate capable of being extrusion coated. In some embodiments, the substrates employed in coating system 12 may be rigid or substantially rigid substrates, and, in the same or other embodiments, may not be a wire, a tube, or a co-extruded substrate. The substrates coated in coating system 12 may also be elongated substrates having any suitable dimensions. According to one embodiment, the substrate may have a length, or largest dimension, of at least about 5 feet, at least about 6 feet, at least about 8 feet, at least about 10 feet, at least about 12 feet and/or not more than about 25 feet, not more than about 20 feet, or not more than about 15 feet. In the same or another embodiment, the substrate can have a length in the range of from about 5 feet to about 25 feet, about 8 feet to about 20 feet, or about 10 feet to about 15 feet. The substrate can also have a width, or second largest dimension, of at least about 1 inch, at least about 2 inches, or at least about 4 inches and/or not more than about 10 inches, not more than about 8 inches, or not more than about 6 inches, or in the range of from about 1 to about 10 inches, about 2 to about 8 inches, or about 4 to about 6 inches. The thickness, or shortest dimension, of the substrate being coated in coating system 12 can be at least about 0.10 inches, at least about 0.25 inches, at least about 0.5 inches and/or not more than about 4 inches, not more than about 2 inches, or not more than about 1 inch, or in the range of from about 0.10 to about 4 inches, about 0.25 to about 2 inches, or about 0.5 to about 1 inch.

Coated substrates produced using coating system 12 may have a wide variety of shapes and/or sizes and may be made of a variety of materials. In one embodiment, the substrates coated in coating system 12 can comprise a material selected from the group consisting of natural wood, wood composites, plastics including cellularized PVC and other foams, metal, fiberglass, ceramics, cement, and combinations thereof. In the same or other embodiments, the substrate material comprises medium-density fiber board (MDF), particle board, oriented strand board (OSB), and combinations thereof. In one embodiment, the substrate can have an average initial moisture content, measured just prior to its introduction into die 20 of coating system 12 of at least about 2 weight percent, at least about 5 weight percent, at least about 8 weight percent and/or not more than about 15 weight percent, not more than about 12 weight percent, or not more than about 10 weight percent, or in the range of from about 2 weight percent to about 15 weight percent, from about 5 weight percent to about 12 weight percent, or about 8 weight percent to about 10 weight percent, based on the total weight of the substrate. In other embodiments, the initial moisture content of the substrate can be less than about 5 percent, less than about 3 percent, or less than about 2 percent, based on the total weight of the substrate.

Any coating material exhibiting sufficient processability and adhesion to the selected substrate may be employed by coating system 12.

In one embodiment, the coating material may comprise one or more polymers or resins, such as thermoplastic polymers or resins capable of being applied to the substrate in a molten or melted form under the operating conditions of die 20. In one embodiment, the glass transition temperature of the polymers utilized in the coating material can be at least about 50° C., at least about 60° C., at least about 65° C., at least about 70° C., at least about 75° C. and/or not more than about 170° C., not more than about 160° C., not more than about 150° C., not more than about 140° C. Examples of polymers or polymer resins suitable for use in coating materials employed with embodiments of the coating system described herein include, but are not limited to, polyesters and copolyesters, such as polyethylene terephthalate or glycol modified polyethylene terephthalate; acid modified polyethylene terephthalate; polycarbonates; acrylics such as poly(methylmethacrylate); poly(acrylonitrile-styrene-acrylate); poly(acrylonitrile-butadiene-styrene); poly(styrene-acrylonitrile); cellulose esters; polyolefins such as polypropylenes and polyethylene; nylons; and polyvinylchloride (PVC).

The coating material can also comprise one or more additives selected from the group consisting of color pigment, UV stabilizers, compatiblizers, rubbers, gloss modifiers (e.g., calcium carbonate), opacity modifiers (e.g., titanium dioxide), impact modifiers (e.g., styrene-butadiene-styrene polymers, acrylonitrile-butadiene-styrene polymers, or methacrylate-butadiene-styrene polymers), and other types of stabilizers typically employed to ensure a durable and appealing finish to the coating applied to the substrate. Several suitable coating compositions are described in detail in co-pending U.S. Patent Application Publication No. 2010/0015456, the entire disclosure of which is incorporated herein by reference to the extent not inconsistent with the present disclosure.

Referring back to FIG. 1, the substrate can initially be introduced into a pretreatment zone 14, which can comprise one or more stages configured to prepare the substrate for coating. For example, pretreatment zone 14 can include one or more milling stages for forming an initial blank stock substrate into a substrate having a desired shape by milling and/or cutting the substrate to a desired profile and/or length. Exemplary substrates are illustrated in FIGS. 5a-5d, which will be discussed in detail shortly, although other suitable shapes are contemplated.

Turning back to FIG. 1, pretreatment zone 14 may also comprise at least one cleaning stage for removing particles of dirt, dust, or other debris from the surface of the substrate before coating. The cleaning stage may comprise a high pressure steam cleaning, a high pressure air cleaning, a solvent cleaning, a water bath cleaning, and/or any other cleaning process appropriate for the particular type of substrate employed in coating system 12. In some embodiments, pretreatment zone 14 may include a stain bath for staining at least a portion of the substrate prior to coating.

Following pretreatment, the substrate can then be introduced into drying zone 16. Drying zone 16 can be configured to heat at least a portion of the surface of the substrate to thereby facilitate removal of at least some of the volatile materials within the substrate. Drying zone 16 can also be operable to remove surface moisture from the substrate, thereby facilitating a more precise control of the substrate size by minimizing the effects of moisture swelling. In one embodiment, the substrate can be dried in the drying zone 16 for at least about 5 seconds, at least about 10 seconds, at least about 20 seconds and/or not more than about 15 minutes, not more than about 10 minutes, not more than about 5 minutes, or in the range of from about 5 seconds to about 15 minutes, about 10 seconds to about 10 minutes, or about 20 seconds to about 5 minutes. Drying zone 16 can be maintained at a temperature of at least about 10° C., at least about 20° C., at least about 30° C., at least about 35° C. and/or not more than 80° C., not more than about 70° C., not more than about 60° C., not more than about 50° C., or in the range of from about 10° C. to about 80° C., about 20° C. to about 70° C., or about 30° C. to about 60° C.

Once removed from drying zone 16, the substrate can pass through optional staging area 18 before being introduced into die 20 via a feed system 28. Feed system 28 can comprise any suitable device or apparatus for pushing the substrate into and at least partially through die 20. In some embodiments, feed system 28 can also be operable to properly align the substrate with an inlet of die 20 (not shown in FIG. 1). Specific configurations of die 20 will be discussed in detail shortly. In some embodiments, feed system 28 can comprise a plurality of rollers, positioned above and below the substrate (not shown), which are configured to engage and push the substrate into die 20. Feed system 28 can be configured to supply individual substrate members into die 20 in a substantially continuous manner, such that, for example, the individual substrate members are fed to the die 20 in a butt-to-butt manner, where contact is maintained between the back end of a first substrate member and the front end of a second substrate member fed behind the first substrate member. In this way, die 20 may be operated in a continuous or semi-continuous manner.

As the substrate is introduced into die 20, at least a portion of the surface of the substrate can be contacted with a coating material introduced into die 20 from coating source 30. Coating source 30 can be any suitable system or apparatus for providing a coating, and, in one embodiment, may be an extruder. The temperature in the die 20 during the coating process can be any temperature sufficient to maintain the incoming coating material in a liquid or substantially liquid state. In some embodiments, the temperature in die 20 during coating can be at least about 50° C., at least about 100° C., at least about 200° C. and/or not more than about 500° C., not more than about 400° C., not more than about 300° C., or in the range of from about 50° C. to about 500° C., about 200° C. to about 400° C., or about 200° C. to about 300° C. The pressure in die 20 during the coating step can be at least about 25 pounds per square inch (psi), at least about 50 psi, at least about 75 psi and/or not more than about 5,000 psi, not more than about 3,500 psi, not more than about 2,000 psi, not more than about 1,500 psi, not more than 1,000 psi, or in the range of from about 25 to about 5,000 psi, from about 50 to about 3,500 psi, or from about 100 to about 2,000 psi.

Figure 2:
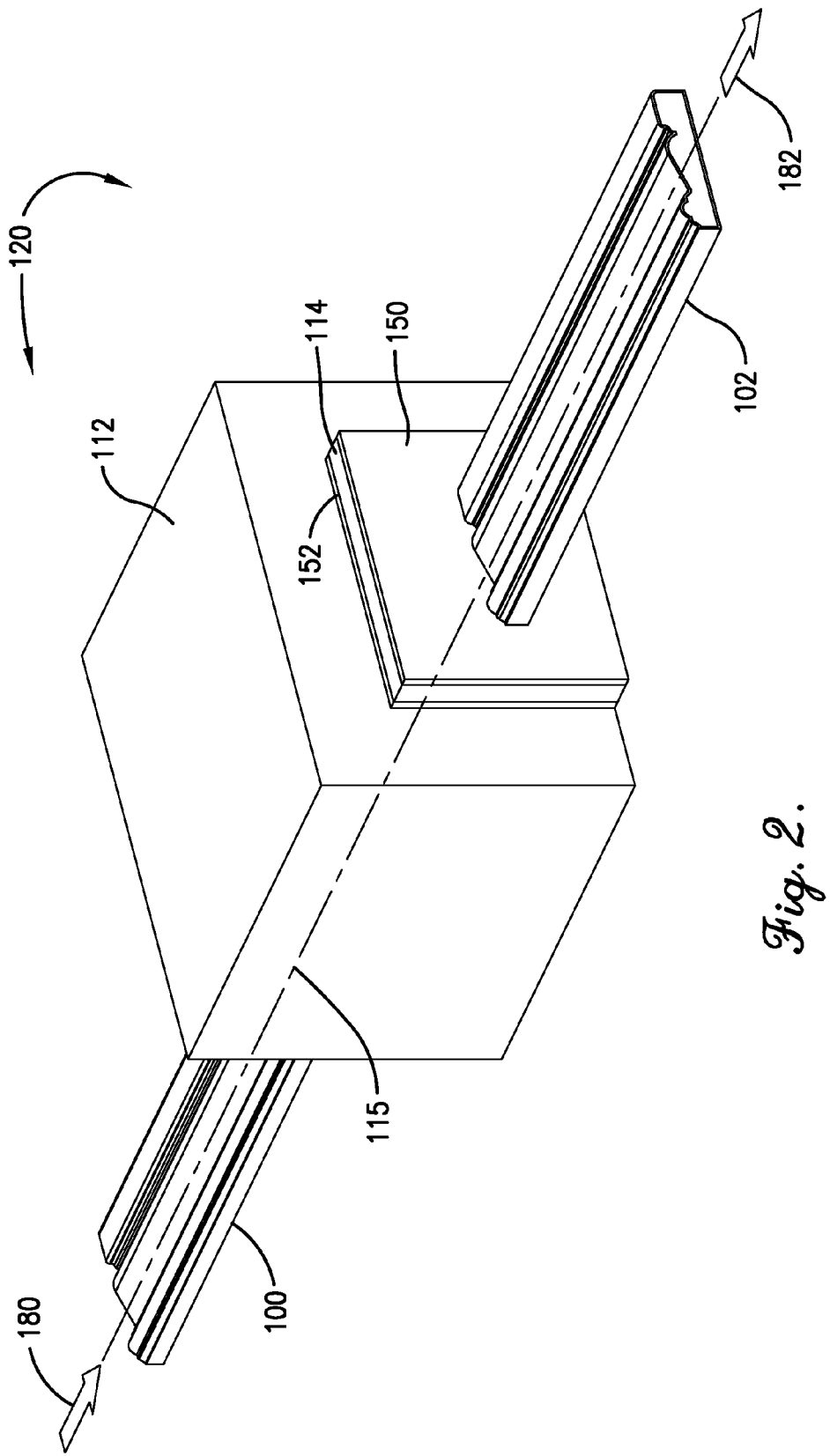
FIG. 2 is a perspective view of a die assembly capable of extrusion coating an elongated substrate according to one embodiment of the present invention.
Figure 3:
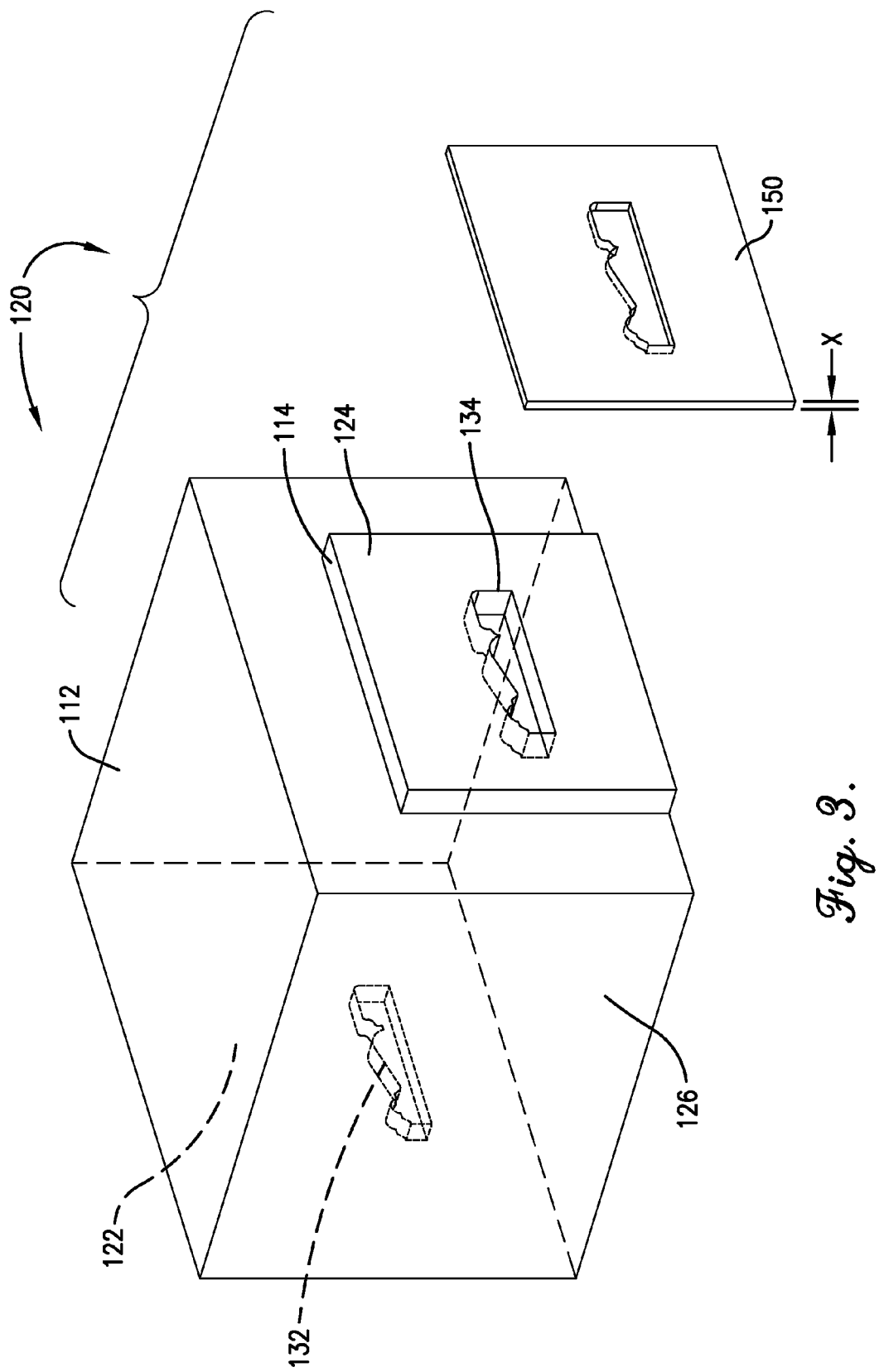
FIG. 3 is an exploded perspective view of the die assembly depicted in FIG. 2, particularly illustrating the insulating member affixed to the outlet wall of the die.

Turning now to FIGS. 2 and 3, one embodiment of a die 120 suitable for use in coating system 12 as described above is provided. Die 120 can be any suitable type of die capable of contacting at least a portion of a substrate 100 with a coating material to thereby provide a coated substrate 102. In one embodiment, die 120 can be a cross-head die configured and operated as described, for example, in U.S. Pat. Nos. 6,660,086 and 7,347,795, or co-pending U.S. Pat. App. Publication No. 2011/0223342, the entireties of which are incorporated herein by reference to the extent not inconsistent with the present disclosure. In one embodiment, die 120 can be configured to apply a coating material to at least a portion of the surface of substrate 100 in a uniform and controlled manner and can be operated continuously and at an average line speed of at least about 25 feet per minute (ft/min), at least about 50 ft/min, at least about 75 ft/min, at least about 100 ft/min, or at least about 125 ft/min.

As shown in FIGS. 2 and 3, die 120 comprises a die block 112 and a die plate 114 coupled to or proximate the front wall of die block 112. As used herein, the directional terms "front" and "forward," when referring to a die, designate the side or direction at which a substrate would normally exit the die after being coated. Conversely, the directional terms "rear" and "back," as used herein, refer to the side of the die in which the substrate is intended to enter. Thus, as shown in FIG. 2, a substrate 100 would normally pass through die 120 from back to front along a die axis 115, as generally indicated by arrows 180 and 182. According to one embodiment depicted in FIG.

2, die axis 115 may be a substantially horizontal die axis such that it is oriented within about 5° of the horizontal.

As particularly illustrated in FIG. 3, die 120 comprises an inlet wall 122 defined by die body 112, an outlet wall 124 defined by die plate 114, and a coating chamber 126 disposed at least partially therebetween. Inlet wall 122 defines a die inlet 132 configured to receive a substrate (not shown in FIG. 3) into die 120 and outlet wall 124 defines a die outlet 134 configured to discharge the coated substrate from die 120. In one embodiment, die inlet 132 and die outlet 134 each define respective inner and outer profiles that may correspond, or substantially correspond, to the shape of the lateral cross-sectional profile of the substrate, as will be discussed in detail shortly.

According to one embodiment, die 120 can further comprise a first insulating member 150 affixed to at least a portion of outlet wall 124 of die 120. In some embodiments, as depicted in FIG. 2, die 120 can include an optional second insulating member 152 disposed between die block 112 and die plate 114. Insulating member 150 (and insulating member 152 when present), can be constructed of any suitable insulating material having a thermal conductivity lower than the thermal conductivity of outlet wall 124 of die 120. In one embodiment, insulating member 150 and, if present, insulating member 152 can be formed of a material having a thermal conductivity of at least about 0.01 Watts per-meter Kelvin (W/mK), at least about 0.05 W/mK, at least about 0.1 W/mK and/or not more than about 2 W/mK, not more than about 1 W/mK, not more than about 0.5 W/mK, or in the range of from about 0.01 to about 2 W/mK, from about 0.05 to about 1 W/mK, or about 0.1 to 0.5 W/mK, measured according to ASTM C-177. Examples of suitable insulating materials can include, but are not limited to, mica and calcium silicate. In one embodiment, insulating members 150, 152 can have a thickness, X, as shown in FIG. 3 of at least about ⅛ inch, at least about ¼ inch, at least about ½ inch and/or not more than about 3 inches, not more than about 2 inches, not more than about 1 inch, not more than about ¾ inches, or in the range of from about ⅛ inch to about 3 inches, from about ¼ inch to about 2 inches, or about ½ inch to about 1 inch.

In an alternative embodiment, die 120 may comprise a device or system capable of creating a fluid insulator in place of, or in addition to, insulating member 150. According to this embodiment, a region or "curtain" of air, nitrogen, or other pressurized fluid may be configured proximate die outlet 134 and may perform a similar function as insulating member 150. Similarly to insulating member 150, the temperature of outlet wall 124 may be maintained within a similar temperature range as described in detail below.

Figure 4:
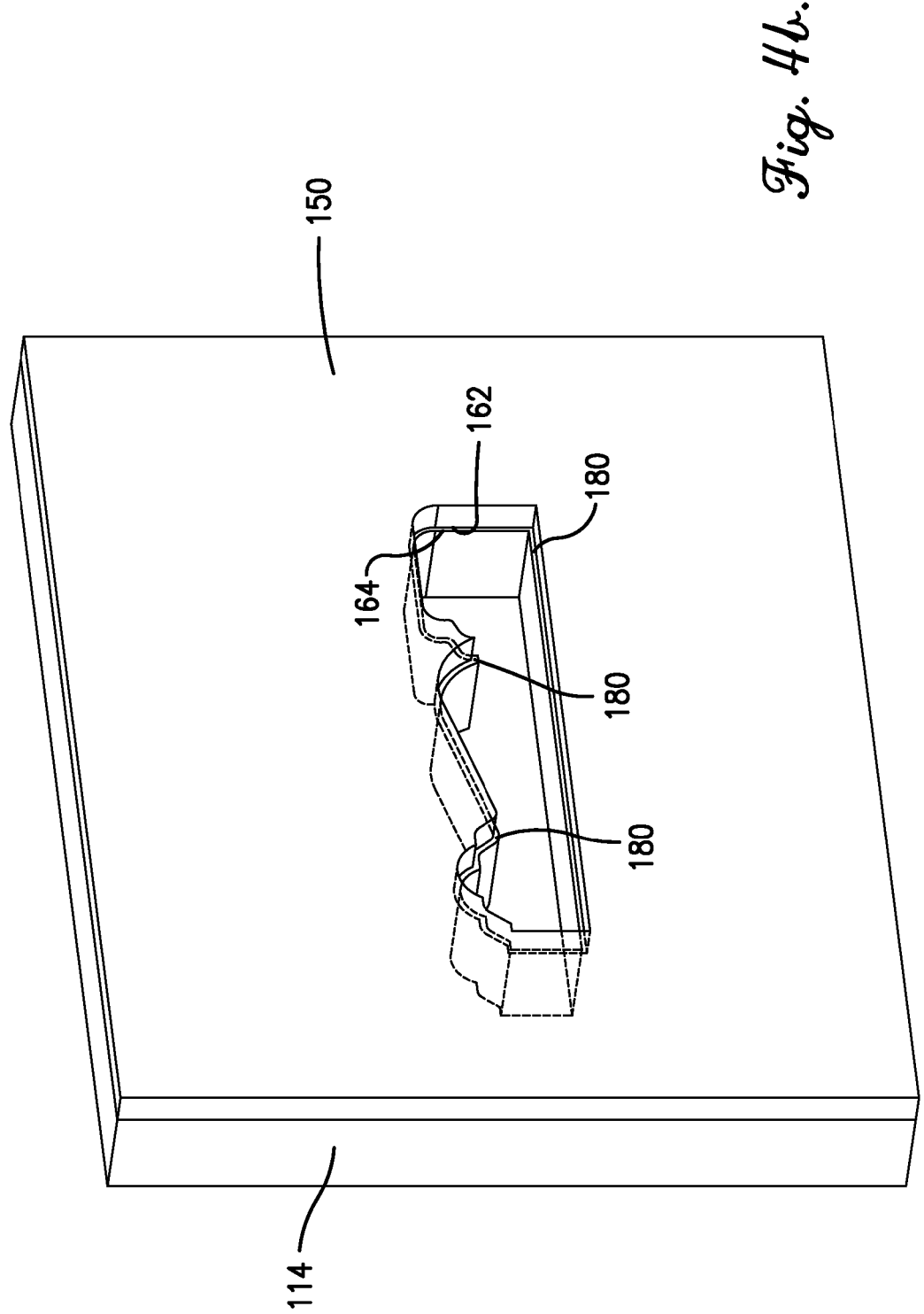
FIG. 4*a* is a partial rotated exploded view of the die outlet wall and insulating member of the die assembly illustrated in FIGS. 2 and 3.
FIG. 4*b* is a perspective view of an insulating member affixed to the die outlet wall, particularly illustrating the minimum distance between the insulating member and the die outlet.

Turning now to FIG. 4a, an exploded rotated view of die plate 114 and insulating member 150 of die 120 is provided. As shown in FIG. 4a, insulating member 150 comprises a substrate inlet 154, a substrate outlet 156, and a shaped passageway 158 defined therebetween. In addition, one or more metal support plates (not shown) may be positioned on either side of insulating member 150 for further stabilization and support. Insulating member 150 can be affixed to outlet wall 124 of die 120 such that shaped passageway 158 at least partially surrounds die outlet 134, as shown in FIG. 4b, and reduces the surface area of outlet wall 124 exposed to the downstream quench zone (not shown). As a result, the temperature of outlet wall 124 proximate die outlet 134 may be maintained closer to the temperature of the coating melt within die 120, and, in some embodiments, may be no more than about 60° C., no more than about 50° C., no more than about 40° C., not more than about 35° C., or not more than about 20° C. less than the temperature of the coating material contacted with the substrate in die 120. In other embodiments, the temperature of die outlet wall 124 may be less than 5° C., less than 2° C., or less than 1° C. lower than the temperature of the coating material contacting the substrate within die 120.

According to one embodiment illustrated in FIG. 4b, a small gap 180 may be formed between the inner edge of substrate inlet 154 (shown as edge 162) and the outer edge of die outlet 134 (shown as edge 164) when insulating member 150 is affixed to outlet wall 124 of die 120 as shown in FIG. 4b. In one embodiment, the smallest gap 180 formed (also known as the minimum distance) between the edge 162 of substrate inlet 154 and the edge 164 of die outlet 134 can be at least 1 mil, at least 2 mils, at least 5 mils and/or not more than about 100 mils, not more than about 85 mils, not more than about 75 mils, not more than about 65 mils, not more than about 50 mils, not more than about 45 mils, not more than about 35 mils, not more than about 25 mils, not more than about 20 mils, or not more than about 10 mils, or from about 1 mil to about 30 mils, about 1 mil to about 25 mils, or about 1 mil to about 20 mils. In one embodiment, the sizes of the cross-sections of shaped passageway 158 and die outlet 134 may be substantially the same, such that the cross-sectional areas of shaped passageway 158 and die outlet 134 can be within no more than about 25 percent, no more than about 20 percent, no more than about 15 percent, no more than about 10 percent, no more than about 5 percent, or no more than about 1 percent of one another.

Shaped passageway 158 may be configured to have any suitable cross-sectional shape. Preferably, shaped passageway 158 can have a constant cross-sectional shape and/or size, such that the size and/or shape of shaped passageway 158 remains substantially constant throughout its entire length. In general, the cross-sectional shapes of die outlet 134 and substrate inlet 154 of shaped passageway 158 may be different from one another, while, in some embodiments, the cross-sectional shapes may be substantially the same. For example, in one embodiment, the cross-sectional shapes of die outlet 134 and shaped passageway 158 may be substantially geometrically similar, while, in other embodiments, shaped passageway 158 and die outlet 134 may have congruent cross-sectional shapes. As used herein, the term "geometrically similar" refers to two or more objects having substantially the same shape, while the term "congruent" refers to two objects having the same shape and size. Further, at least one of shaped passageway 158 and die outlet 134 may have a cross-sectional shape geometrically similar to the lateral cross-sectional shape of the coated substrate passing therethrough. Specific examples of lateral cross-sectional shapes of the coated substrate will be discussed in detail shortly.

Turning back to FIG. 2, as coated substrate 102 exits outlet 134 of die 120 and passes through insulating member 150, at least a portion of the coating on the substrate can maintain contact with at least a portion of the wall of shaped passageway 158. In one embodiment, the residence time of coated substrate 102 in shaped passageway 158 can be at least about 0.1 seconds, at least about 0.25 seconds, at least about 0.5 second and/or not more than about 2 seconds, not more than about 1.5 seconds, not more than about 1 second, or in the range of from about 0.1 seconds to about 2 seconds, about 0.25 seconds to about 1 second, or about 0.5 seconds to about 1 second, measured from the time a single point on coated substrate 102 exits die outlet 134 until the time the same point exits shaped passageway 158.

Referring again to FIG. 1, the coated substrate exiting die 20 enters quench zone 22, wherein it can be at least partially cooled via contact with a quench fluid to thereby provide a cooled, coated substrate. In one embodiment, the temperature of the quench fluid in quench zone 22 can be at least about 2° C., at least about 4° C., at least about 8° C., at least about 10° C., at least about 15° C. and/or not more than about 65° C., not more than about 55° C., not more than about 45° C., not more than about 35° C., or in the range of from about 4° C. to about 55° C., from about 10° C. to about 45° C., or about 15° C. to about 35° C. Examples of suitable quench fluids can include, but are not limited to, water, air, or nitrogen, or any other liquid or gas suitable for use with the specific type of substrate and coating material being used. In some embodiments, the pressure of quench zone 22 can be less than 250 kPa, less than 175 kPa, less than about 100 kPa, less than about 75 kPa, less than about 50 kPa, or less than about 25 kPa.

Quench zone 22 can include any suitable means for contacting the coated substrate with a quench fluid. In one embodiment, quench zone 22 may include a quench bath for at least partially submerging the coated substrate into a quench liquid. In another embodiment, quench zone 22 can include a pressure box configured to maintain a pressurized environment for the coating material to cool on the substrate. When quench zone 22 utilizes a pressure box (not shown), the pressure box can be configured to cool the coated substrate under a pressure of at least about 20 psi, at least about 25 psi, at least about 30 psi and/or not more than about 100 psi, not more than about 80 psi, not more than about 60 psi, or in the range of from about 20 to about 100 psi, from about 25 psi to about 80 psi, or from about 30 psi to about 60 psi. In other embodiments, quench zone 22 may utilize any other suitable cooling system or method, including, for example, cooled rollers (not shown). In some embodiments, coated substrate 102 may simply be allowed to cool at ambient temperature and/or pressure.

Once the cooled, coated substrate is removed from quench zone 22, it can then be passed through an optional post treatment zone 24, if desired. Examples of suitable post-treatment processes can include, but are not limited to, abrasion via one or more types of media treatment, gloss enhancements, in-line primer treatments, painting, staining, and combinations thereof. In another embodiment shown in FIG. 1, the cooled, coated substrate may be removed from coating system 12 with no post-quench treatment, as indicated by line 26.

According to one embodiment, the cooled, coated articles produced by systems and processes according to embodiments of the present invention may exhibit a highly desirable surface texture and visual appearance. For example, in one embodiment, the cooled, coated substrate withdrawn from coating system 12 may be substantially bubble-free. As used herein, the term "substantially bubble free" refers to a coated substrate exhibiting less than 10 bubbles per 100 square feet as measured by visual detection. In one embodiment, coated substrates according to embodiments of the present invention can exhibit less than about 10 bubbles per 100 square feet, less than about 5 bubbles per 100 square feet, less than about 2 bubbles per 100 square feet, or less than 1 bubble per 100 square feet.

In the same or other embodiments, the water-quenched, extrusion coated substrate exiting quench zone 22 may have a relatively smooth, untextured surface. For example, in one embodiment, at least a portion of the surface of the coated substrate can have an average $R_{max}$ surface roughness of no more than about 40, no more than about 30, no more than about 25, no more than about 20, no more than about 15, no more than about 12, or no more than about 10. As used herein, the term "average $R_{max}$ surface roughness" refers to the maximum roughness depth measured from the highest point to the lowest point along the measurement length, averaged over all measurements taken. The values for surface roughness parameters, including $R_{max}$, provided herein were measured using a Mitutoyo Surftest SJ-201P roughness tester with a 5-micron stylus, as described in detail in Examples 34-42 below. In addition to $R_{max}$, several other roughness parameters were measured via profilometry for several coated substrates and values and descriptions for each of these additional parameters are provided below in Examples 34-42. In some embodiments, coated substrates having a surface texture as described above may be obtained even in the absence of post-quench treatment, such as sanding, buffing, or the like. Unlike conventionally-prepared water-quenched articles, extrusion coated articles of the present invention exhibit unexpected surface smoothness while retaining an acceptable visual appearance, including a reduced occurrence of bubbles and surface blisters.

Referring now to FIGS. 5a-d, several coated substrates 200a-d configured according to various embodiments of the present invention are illustrated. As shown in each of FIGS. 5a-d, each coated substrate 200a-d comprises an elongated substrate 210a-d and at least one coating layer 220a-d extrusion coated thereon. Although shown as including a single coating layer in FIGS. 5a-d, it is contemplated that coated articles according to some embodiments of the present invention may include two or more coating layers. The average thickness of coating layer (or layers, if applicable) 220a-d may be at least about 2 mils, at least about 4 mils, at least about 6 mils and/or not more than about 40 mils, not more than about 35 mils, not more than about 25 mils, or not more than about 15 mils, as determined based on the amount of coating material consumed during steady state coating of the substrate. For example, average coating thickness can be calculated by dividing the total volume of coating material consumed by the total surface area of substrate coated with that volume of material.

The coating layer 220a-d can be affixed to substrates 210a-d such that the coating material can be sufficiently adhered directly to at least a portion of the substrate. Unlike conventional "peel-and-stick" or other similar coatings, coated substrates according to embodiments of the present invention do not include a layer of glue or other adhesive disposed between the surface of the substrate and the coating material. In one embodiment, the coating can have an average adhesion peel force of at least 0.10 pounds (Ib), at least about 0.25 lbs, at least about 0.35 lbs, or at least 0.40 lbs and/or not more than about 2 lbs, not more than about 1.5 lbs, not more than about 1 Ib, not more than about 0.75 lbs, not more than about 0.65 lbs, or not more than 0.50 lbs, measured with a 90° T-Peel test described in ASTM Method D3330, Method F or in the range of from about 0.10 to about 2 lbs, about 0.35 to about 1.5 lbs, or about 0.40 to about 11b.

Figure 5C:
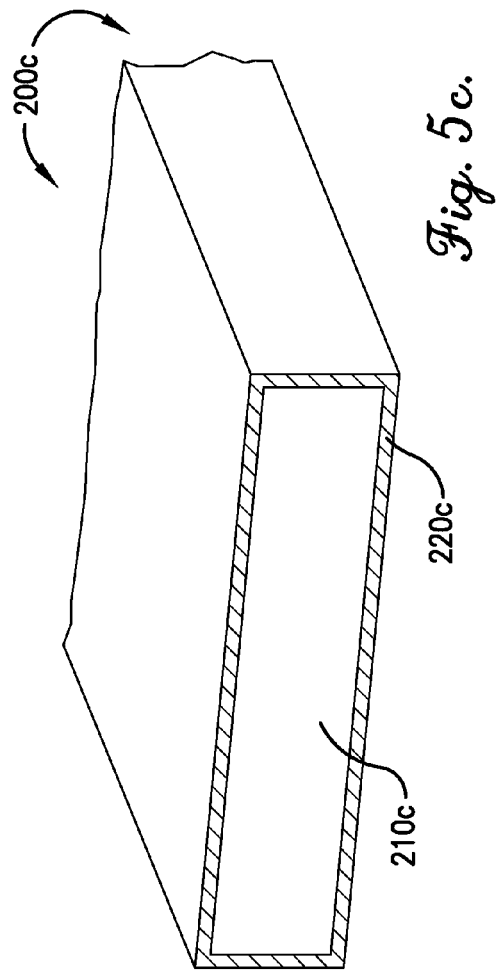
FIG. 5*c* is an extrusion coated article according to yet another embodiment of the present invention.
Figure 5D:
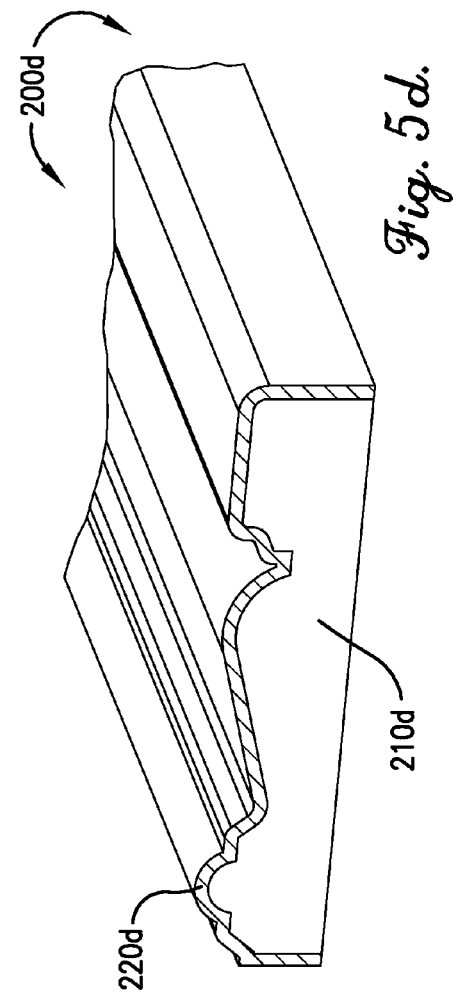
FIG. 5*d* is an extrusion coated article according to still another embodiment of the present invention.
Figure 5A:
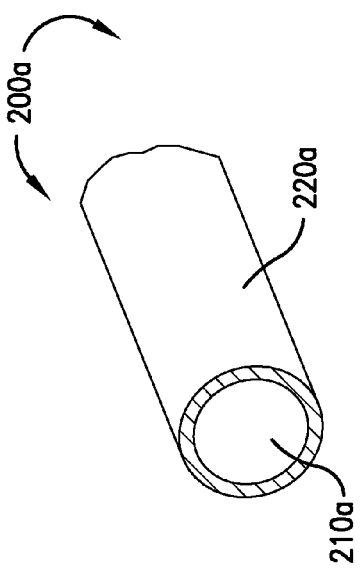
FIG. 5*a* is an extrusion coated article according to one embodiment of the present invention.
Figure 5B:
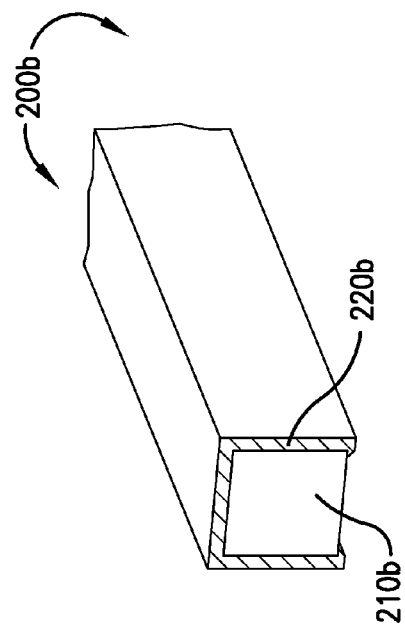
FIG. 5*b* is an extrusion coated article according to another embodiment of the present invention.
Figure 6G:
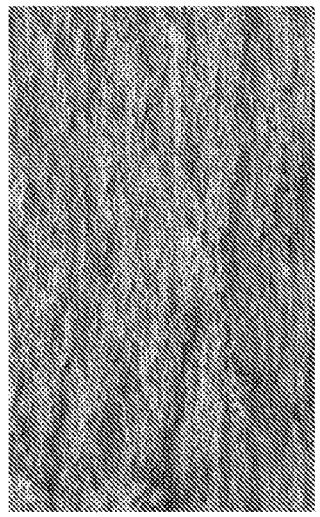
FIG. 6g is an SEM image taken along a portion of the surface of the substrate coated in Example 38 at a magnification of 250×.
Figure 6I:
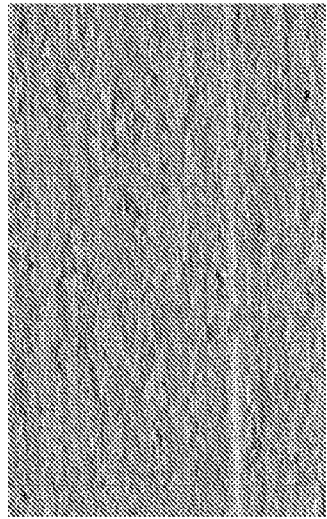
FIG. 6i is an SEM image taken along a portion of the surface of the substrate coated in Example 42 at a magnification of 250×.
Figure 6F:
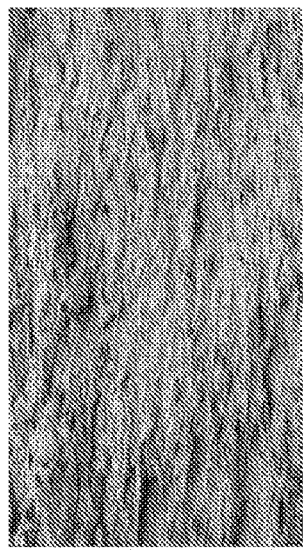
FIG. 6f is an SEM image taken along a portion of the surface of the substrate coated in Example 36 at a magnification of 250×.
Figure 6H:
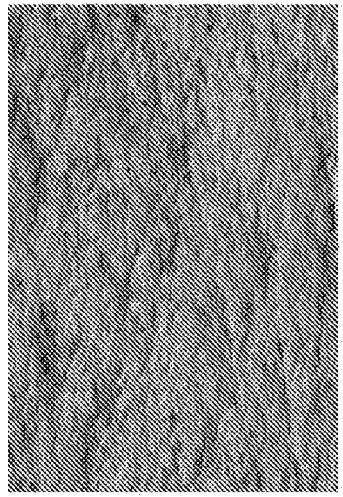
FIG. 6h is an SEM image taken along a portion of the surface of the substrate coated in Example 40 at a magnification of 250×.

In some embodiments, the coating may be applied to only a portion of the surface of the substrate, as illustrated in FIGS. 5b and 5d, such that at least about 50 percent, at least about 65 percent, at least about 75 percent, at least about 85 percent, or at least about 95 percent of the total surface area of substrate 200 is covered with a coating material. In some embodiments as shown in FIGS. 5b and 5d, one or more sides of an n sided substrate (wherein n is an integer between 3 and 10, inclusive) may be left partially (FIG. 5b) or totally (FIG. 5d) uncoated, such that n-1 sides are completely coated by the material. In other embodiments, the entirety of substrate 210a,c may be coated such that all sides of the substrate are completely encapsulated by the coating material, as particularly illustrated in FIGS. 5a and 5c.

In addition, as particularly illustrated by the exemplary coated substrates 200a-d in FIGS. 5a-d, coated substrates of the present invention can also have any desired lateral cross-sectional shape. In one embodiment, the substrate may have a symmetric lateral cross-section, while, in other embodiments, the substrate can have a non-symmetric lateral cross-section. As used herein, the term "symmetric" refers to any shape which exhibits symmetry along all lines drawn through the center point of the shape. Similarly, the term "non-symmetric" refers to a shape which exhibits asymmetry along at least one line drawn through its center point. In one embodiment, the substrate may have a symmetric circular (as shown in FIG. 5a), while, in other embodiments, the substrate may have a non-symmetric square (FIG. 5b) or rectangular lateral cross-section (as shown in FIG. 5c). In another embodiment, the substrate may have an irregularly-shaped non-symmetric lateral cross-section that includes at least one curvilinear side having both concave and convex sections, as depicted in the embodiment shown in FIG. 5d.

The various aspects of the present invention can be further illustrated and described by the following Examples. It should be understood, however, that these Examples are included merely for purposes of illustration and are not intended to limit the scope of the invention, unless otherwise specifically indicated.

EXAMPLES

Example 1

Two samples of natural finger-jointed pine were prepared for coating in a lab scale extrusion coating system. The first sample had a rectangular lateral cross-section measuring approximately 5/8 inch (1.6 cm) by 7/8 inch (2.2 cm) and the second sample had a complex cross-sectional shape similar to the one depicted in FIG. 5d, which is used with many commercially-available types of crown molding. This sample, referred to as the E1 cross-section sample, had lateral cross-sectional dimensions measuring approximately 3.25 inches (8.3 cm) by 5/8 inch (1.6 cm).

Each of the samples described above were preheated in an oven to a temperature of about 100° F. (38° C.) and the heated substrates were placed in a staging area before being individually passed through a die assembly connected to a 2½-inch extruder. A thermoplastic coating material that included glycol-modified poly(ethylene terephthalate), a calcium carbonate gloss modifier, a titanium dioxide opacity modifier, a UV stabilizer, and an impact modifier was extruded into the die assembly and applied to each substrate at a melt temperature of 500° F. (260° C.). The pressure in the die assembly was maintained between 300 and 500 psi (2070 and 3450 kPa) during coating and the target coating thickness was between 0.006 and 0.0012 inches (0.015 and 0.030 cm). The substrates passed through the die assembly at a line speed of 25 board feet per minute (7.6 meters per minute).

In this Example, no insulating member was employed on the die outlet wall and no water bath was employed. The coated samples exited the die assembly and were allowed to cool in under ambient temperature and pressure. Upon visual inspection of the cooled, coated substrates, it was noted that the samples had an unacceptably high concentration of surface bubbles and blisters.

Example 2

Two wood samples having a rectangular and an E1 cross-section were prepared and coated as described above in Example 1, except the coated samples exiting the die assembly were immediately passed into a water bath to cool. The temperature of the water bath was maintained between 60° F. and 75° F. (16° C. and 24° C.). The outlet wall of the die assembly was not insulated and was directly contacted by the water bath. The temperature of the die outlet wall was approximately 100° F. to 150° F. less than the melt temperature. Upon visual inspection, it was noted that the cooled, coated substrates were substantially bubble-free, but exhibited an unacceptable surface texture.

Example 3

Two wood samples having a rectangular and an E1 cross-section were prepared and coated as described above in Example 1. The coated samples exiting the die assembly were immediately passed into a water bath to cool, as described above in Example 2. In addition, a 1/8-inch (0.32 cm) thick mica insulating member with a rectangular opening was affixed to the outlet wall of the die and the coated substrate passed through the insulating member as it exited the die assembly. The rectangular opening was larger than the die opening, so that a portion of the outlet wall of the die was still exposed to quench water. Coated samples exiting the die outlet passed through the insulating member and were cooled in a water bath as described in Example 2. Upon visual inspection, it was noted that the cooled, coated substrates were substantially bubble-free, but exhibited an unacceptable surface texture.

Example 4

A wood sample having a rectangular cross-section was prepared and coated as described above in Example 1. The coated sample exiting the die assembly was passed through an insulating member affixed to the outlet wall of the die as described in Example 3, except the opening of the insulating member was cut to have the same size and shape as the coated substrate. Upon visual inspection, it was noted that the cooled, coated substrate was not only substantially bubble-free, but also exhibited a smooth, non-textured surface.

Example 5

A wood sample having an E1 cross-section was prepared and coated as described above in Example 1. The coated sample exiting the die assembly was passed through an insulating member affixed to the outlet wall of the die having the same size and shape as the coated substrate, similar to the procedure described in Example 4. Upon visual inspection, it was noted that the cooled, coated E1 substrate was not only substantially bubble-free, but also exhibited a smooth, non-textured surface.

Examples 6-18

Several samples of finger-jointed pine having an E1 cross-section were prepared and coated as described in Example 1. Similar to Example 5, each coated sample was passed through a 1/8-inch thick mica insulator affixed to the die outlet wall and cut to have an opening the same size and shape as the coated substrate. The melt temperature of the coating was maintained at 475° F. (246° C.), but the water bath temperature, the substrate preheat temperature, and the die outlet wall temperature were varied. Each of the cooled, coated substrates removed from the quench water bath was visually evaluated and the surface appearance was noted. The operating conditions and visual appearance results for each of Examples 6-18 are summarized in Table 1, below.

TABLE 1

Operating Conditions and Results for Samples Coated in Examples 6-18

| Example | Water Bath Temperature (° F.) | Preheat Temperature (° F.) | Die outlet wall Temperature (° F.) | Surface Appearance |
|---|---|---|---|---|
| 6 | 80 | 110 | 475 | No texture or bubbles |
| 7 | 40 | 70 | 400 | No texture or bubbles |
| 8 | 120 | 150 | 400 | No texture or bubbles |
| 9 | 80 | 110 | 475 | No texture or bubbles |
| 10 | 120 | 70 | 550 | No texture or bubbles |
| 11 | 40 | 150 | 550 | No texture or bubbles |
| 12 | 80 | 110 | 475 | No texture or bubbles |
| 13 | 120 | 70 | 400 | No texture or bubbles |
| 14 | 40 | 150 | 400 | No texture or bubbles |
| 15 | 80 | 110 | 475 | No texture or bubbles |
| 16 | 120 | 150 | 550 | No texture or bubbles |
| 17 | 40 | 70 | 550 | No texture or bubbles |
| 18 | 80 | 110 | 475 | No texture or bubbles |

Examples 19-21

Several samples of finger-joint pine having an E1 cross-section were prepared and coated as described in Example 1. Each substrate was coated in a die assembly with a melt temperature of 475° F. (246° C.) and a die outlet wall temperature of 500° F. (260° C.), but the thickness of the mica insulating insulator affixed to the outer wall of the die was varied. The opening in the insulating member was cut to match the size and shape of the E1 profile. The water bath temperature was maintained between 65° F. and 80° F. (18° C. and 27° C.). Each of the cooled, coated substrates removed from the quench water bath were visually evaluated and the surface appearance was noted. The insulator thickness and visual appearance results for each of Examples 19-21 are summarized in Table 2, below.

TABLE 2

Operating Conditions and Results for Samples Coated in Examples 19-21

| Example | Insulator Thickness (in) | Surface Appearance |
|---|---|---|
| 19 | 475 | No texture or bubbles |
| 20 | 400 | No texture or bubbles |
| 21 | 400 | No texture or bubbles |

Examples 22-30

Several samples of medium-density fiber board (MDF) and finger-joint pine (FJP) each having an E1 cross-sectional shape were prepared and coated as described in Example 1, above. The melt temperature of the coating was 500° F. and the samples were passed through the die at a board speed of 15 feet per minute. The sample coated in Example 22 was allowed to cool under ambient conditions, while the samples coated in Examples 24-30 were cooled in a water quench bath maintained at a temperature of about 70° F. No insulating member was used in Examples 22-24. For Examples 25-30, a ⅛-inch thick mica insulator having an inlet of E1 shape, but varying size were used in order to vary the clearance between the inner edge of the insulator inlet and the outer edge of the die outlet. The surface appearance and texture of the cooled, coated substrates for each run were observed. The minimum insulator clearance and the visual appearance results for the samples tested in each of Examples 22-30 are summarized in Table 3, below.

TABLE 3

Operating Conditions and Results for Samples Coated in Examples 22-30

| Example | Substrate | Quench Medium | Insulator Clearance, mils | Surface Appearance |
|---|---|---|---|---|
| 22 | MDF | Air | No insulator | Smooth and glossy |
| 23 | MDF | Water, 70° F. | No insulator | Very rough/textured |
| 24 | FJP | Water, 70° F. | No insulator | Very rough/textured |
| 25 | MDF | Water, 70° F. | 200 | Very rough/textured |
| 26 | FJP | Water, 70° F. | 200 | Very rough/textured |
| 27 | MDF | Water, 70° F. | 100 | Moderately rough/textured |
| 28 | FJP | Water, 70° F. | 100 | Moderately rough/textured |
| 29 | MDF | Water, 70° F. | 10 | Smooth, matte |
| 30 | FJP | Water, 70° F. | 10 | Smooth, matte |

Examples 31-33

Several samples of medium density fiberboard having an E1 cross-section were prepared and coated as described in Example 1. Each substrate was coated in a die assembly with a melt temperature of 500° F. and was passed through a mica insulator having a thickness of ⅛ inch and a clearance of 100 mils, measured from the outer edge of the die outlet to the inner edge of the insulator inlet. The speed at which the substrate passed through the die was varied. The coated substrates were cooled in a water bath having a temperature of 70° F. Each of the cooled, coated substrates removed from the quench water bath were visually evaluated and the surface appearance was noted. The line speed and visual appearance results for each of Examples 31-33 are summarized in Table 4, below.

TABLE 4

Operating Conditions and Results for Samples Coated in Examples 31-33

| Example | Line Speed (feet/min) | Surface Appearance |
|---|---|---|
| 31 | 15 | Rough/textured |
| 32 | 50 | Moderately rough |
| 33 | 100 | Slightly rough |

Examples 34-42

Several 8-foot long samples of medium-density fiber board (MDF) and finger-joint Radiata pine (FJP) each having an E1 cross-sectional shape were prepared and coated as described in Example 1, above. The samples were passed through the die at a board speed of 15 feet per minute. The sample coated in Example 34 was allowed to cool under ambient conditions, while the samples coated in Examples 35-42 were cooled in a water quench bath maintained at a temperature of about 60° F. No insulating member was used in Examples 34-36. For Examples 37-42, various ¼-inch thick mica insulators, each having an E1-shaped inlet of but a different opening size, were used in order to vary the clearance between the inner edge of the insulator inlet and the outer edge of the die outlet. The surface appearance and texture of the cooled, coated substrates were observed for each run. The minimum insulator clearance and the visual appearance results for the samples tested in each of Examples 34-42 are summarized in Table 5a, below.

TABLE 5a

Visual Inspection Results for Samples Coated in Examples 34-42

| Example | Substrate | Quench Medium, Temperature | Insulator Clearance, mils | Surface Appearance |
|---|---|---|---|---|
| 34 | MDF | Air, ambient | No insulator | Smooth, no texture |
| 35 | MDF | Water, 60° F. | No insulator | Heavily textured |
| 36 | FJP | Water, 60° F. | No insulator | Heavily textured |
| 37 | MDF | Water, 60° F. | 200 mil | Heavily textured |
| 38 | FJP | Water, 60° F. | 200 mil | Heavily textured |
| 39 | MDF | Water, 60° F. | 100 mil | Lightly textured |
| 40 | FJP | Water, 60° F. | 100 mil | Lightly textured |
| 41 | MDF | Water, 60° F. | 20 mil | Smooth, no texture |
| 42 | FJP | Water, 60° F. | 20 mil | Smooth, no texture |

After cooling, the samples were cut into 3-foot segments and surface roughness measurements were taken at two randomly-selected locations on the back (flat) side of the sample. The surface roughness of each sample was measured using a Mitutoyo SJ-210 having a 2 micron stylus with a 60 degree radius. The measurements were taken in accordance with the procedure described in the roughness tester manual over a sample length of 1 inch. The results of the surface roughness measurements for each of the samples in Examples 34-42 are summarized in Table 5b, below.

In addition to $R_{max}$, which as discussed above, is the maximum roughness depth measured from the highest point to the lowest point along the measurement length, the following surface roughness parameters were also measured for each sample in Examples 34-42: $R_a$, $R_q$, $R_z$, $R_v$, $R_p$, and $R_{pm}$. $R_a$ is the arithmetic average surface roughness, calculated over the entire measured array, while $R_q$ is the root-mean-square average between the height deviations and the mean line or surface calculated over the entire measured array. $R_z$ is an average of the ten greatest peak-to-valley separations in the sample, while $R_{max}$ is the maximum roughness depth measured from the highest peak to the lowest value along a measurement length. $R_v$ is the maximum profile valley depth or the height difference between the mean (average) height line and the lowest point over the entire measurement length, while $R_p$ is the maximum profile peak height or the height difference between the mean height line and the highest point over the entire measurement length. $R_{pm}$ is the average maximum profile peak height, measured as the average of successive $R_p$ values over the measurement length. Values for each of these roughness parameters, taken for each coated substrate in Examples 34-42 are provided in Table 5b, below.

Additionally, several scanning electron microscope (SEM) images were taken of each of the coated substrates in Examples 34-42 at an SEM HV of 5.0 kV (Examples 34 and 35) or 3.0 kV (Examples 36-42) and a magnification of 250×. The resulting images for coated MDF substrates are presented as FIGS. 6a-6e (Examples 34, 35, 37, 39, and 41), while the coated FJP substrates are provided as FIGS. 6f-6i (Examples 36, 38, 40, and 42).

TABLE 5b

Surface Roughness by Profilometry for Examples 34-42

| Example | Measurement | Rmax | Rpm | Ra | Rq | Rz | Rp | Rv |
|---|---|---|---|---|---|---|---|---|
| 34 | #1 | 9.723 | 4.605 | 1.378 | 1.718 | 7.917 | 6.031 | 5.146 |
|  | #2 | 9.277 | 4.168 | 1.269 | 1.613 | 7.415 | 4.908 | 5.793 |
|  | Average | 9.50 | 4.39 | 1.32 | 1.67 | 7.67 | 5.47 | 5.47 |
| 35 | #1 | 108.77 | 50.192 | 16.522 | 20.693 | 90.266 | 67.791 | 57.965 |
|  | #2 | 100.76 | 47.123 | 14.328 | 18.816 | 78.695 | 60.456 | 40.305 |
|  | Average | 104.77 | 48.66 | 15.43 | 19.75 | 84.48 | 64.12 | 49.14 |
| 36 | #1 | 99.729 | 44.638 | 13.298 | 16.968 | 77.073 | 56.278 | 43.501 |
|  | #2 | 96.309 | 35.371 | 11.924 | 15.582 | 62.132 | 52.951 | 43.357 |
|  | Average | 98.02 | 40.00 | 12.61 | 16.28 | 69.60 | 54.61 | 43.43 |
| 37 | #1 | 53.11 | 22.24 | 7.914 | 9.936 | 44.103 | 26.983 | 28.822 |
|  | #2 | 64.643 | 29.671 | 8.379 | 10.692 | 50.643 | 36.243 | 29.068 |
|  | Average | 58.88 | 25.96 | 8.15 | 10.31 | 47.37 | 31.61 | 28.95 |
| 38 | #1 | 55.861 | 16.167 | 6.02 | 8.08 | 30.776 | 33.064 | 22.797 |
|  | #2 | 53.53 | 21.787 | 8.372 | 10.638 | 45.464 | 26.678 | 33.494 |
|  | Average | 54.70 | 18.98 | 7.20 | 9.36 | 38.12 | 29.87 | 28.15 |
| 39 | #1 | 35.99 | 18.045 | 6.351 | 7.849 | 33.911 | 21.917 | 20.74 |
|  | #2 | 45.161 | 18.771 | 6.163 | 7.901 | 39.761 | 22.143 | 28.486 |
|  | Average | 40.58 | 18.41 | 6.26 | 7.88 | 36.84 | 22.03 | 24.61 |
| 40 | #1 | 35.307 | 13.883 | 6.229 | 7.549 | 31.805 | 15.914 | 19.393 |
|  | #2 | 62.23 | 17.512 | 6.737 | 8.671 | 37.489 | 21.601 | 40.628 |
|  | Average | 48.77 | 15.70 | 6.48 | 8.11 | 34.65 | 18.76 | 30.01 |
| 41 | #1 | 13.313 | 5.266 | 1.826 | 2.35 | 9.744 | 6.835 | 6.694 |
|  | #2 | 13.76 | 6.426 | 2.102 | 2.583 | 11.475 | 7.7 | 6.674 |
|  | Average | 13.54 | 5.85 | 1.96 | 2.47 | 10.61 | 7.27 | 6.68 |
| 42 | #1 | 12.926 | 5.289 | 1.154 | 1.484 | 8.735 | 9.395 | 5.317 |
|  | #2 | 9.013 | 4.688 | 1.186 | 1.495 | 8.266 | 5.403 | 4.542 |
|  | Average | 10.97 | 4.99 | 1.17 | 1.49 | 8.50 | 7.40 | 4.93 |

Examples 43-45

Figure 7A:
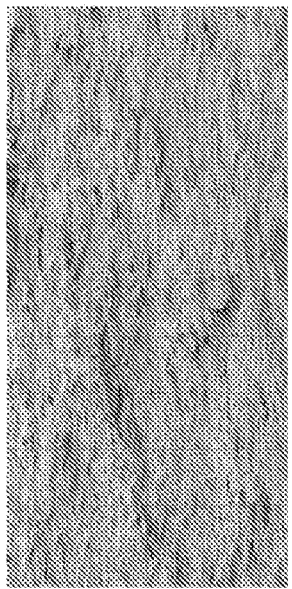
FIG. 7a is an SEM image taken along a portion of the surface of the substrate coated in Example 43 at a magnification of 250×.
Figure 7B:
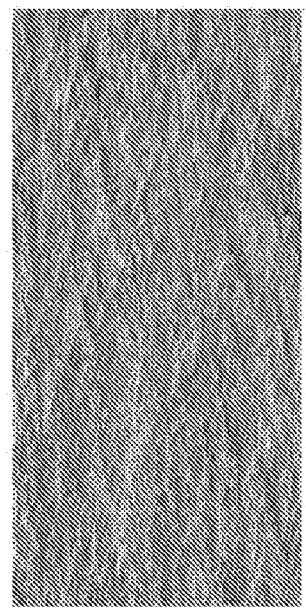
FIG. 7b is an SEM image taken along a portion of the surface of the substrate coated in Example 44 at a magnification of 250×.
Figure 7C:
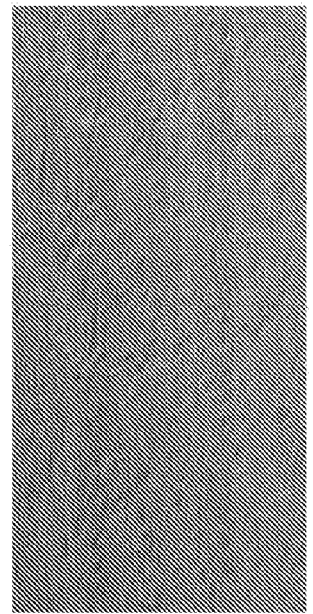
FIG. 7c an SEM image taken along a portion of the surface of the substrate coated in Example 45 at a magnification of 250×.

Several samples of medium density fiberboard having an E1 cross-section were prepared and coated as described in Example 1. Upon exiting the die outlet, each substrate was passed through a mica insulator having a thickness of ¼ inch and a clearance of 100 mils, measured from the outer edge of the die outlet to the inner edge of the insulator inlet. The speed at which the substrate passed through the die and insulator was varied. The coated substrates were cooled in a water bath having a temperature of 60° F. Each of the cooled, coated substrates removed from the quench water bath were visually evaluated and the surface appearance was noted. Additionally, the surface roughness of each of the cooled substrates was measured using a Mitutoyo SJ-210 having a 2 micron stylus with a 60 degree radius, as described in Examples 34-42 above. The line speed and visual appearance results for each of Examples 43-45 are summarized in Table 6a, below, while the surface roughness measurements are provided in Table 6b. Additionally, several scanning electron microscope (SEM) images were taken of each of the coated substrates in Examples 43-45 at an SEM HV of 3.0 kV and a magnification of 250×. The resulting images are provided in FIGS. 7a-7c.

TABLE 6a

Operating Conditions and Visual Results for Samples Coated in Examples 43-45

| Example | Line Speed (feet/min) | Surface Appearance |
|---|---|---|
| 43 | 15 | Lightly textured |
| 44 | 50 | Less textured |
| 45 | 100 | Smooth, no texture |

TABLE 6b

Surface Roughness by Profilometry for Examples 43-45

| Example | Measurement | $R_{max}$ | $R_{pm}$ | $R_a$ | $R_q$ | $R_z$ | $R_p$ | $R_v$ |
|---|---|---|---|---|---|---|---|---|
| 43 | #1 | 30.544 | 15.799 | 4.833 | 6.043 | 28.146 | 16.387 | 14.973 |
| | #2 | 31.667 | 13.52 | 4.509 | 5.72 | 28.174 | 14.31 | 17.681 |
| | Average | 31.11 | 14.66 | 4.67 | 5.88 | 28.16 | 15.35 | 16.33 |
| 44 | #1 | 17.064 | 6.804 | 2.155 | 2.734 | 13.897 | 8.241 | 8.823 |
| | #2 | 15.669 | 6.672 | 2.305 | 2.881 | 13.916 | 8.154 | 8.837 |
| | Average | 16.37 | 6.74 | 2.23 | 2.81 | 13.91 | 8.2 | 8.83 |
| 45 | #1 | 18.796 | 7.72 | 2.437 | 3.06 | 15.642 | 8.383 | 11.169 |
| | #2 | 22.156 | 8.54 | 2.586 | 3.307 | 17.916 | 12.019 | 10.689 |
| | Average | 20.48 | 8.13 | 2.51 | 3.18 | 16.78 | 10.2 | 10.93 |

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A process for coating a substrate, said process comprising:
    (a) introducing an elongated substrate and a coating material into a die;
    (b) contacting said substrate with said coating material in said die to thereby provide a coated substrate;
    (c) removing said coated substrate from said die via a die outlet defined by a die outlet wall of said die;
    (d) passing said coated substrate removed from said die outlet through a shaped passageway formed in an insulating member affixed to said die outlet wall and having a thermal conductivity less than the thermal conductivity of said die outlet wall; and
    (e) cooling said coated substrate withdrawn from said insulating member via contact with a quench fluid to thereby provide a cooled coated substrate,
    wherein the minimum distance between the edge of said shaped passageway and the edge of said die outlet is from about 1 mil to less than 100 mils.

2. The process of claim 1, wherein the minimum cross-sectional area of said shaped passageway and the cross-sectional area of said die outlet are within no more than about 25 percent of one another.

3. The process of claim 1, wherein said cooled, coated substrate has an average $R_{max}$ surface roughness of less than 30.

4. The process of claim 1, wherein the surface of said cooled coated substrate has less than 10 bubbles per 100 feet.

5. The process of claim 1, wherein the coating on said coated substrate is maintained in contact with at least one wall of said insulating member that defines said shaped passageway as said coated substrate passes through said insulating member.

6. The process of claim 1, wherein at least one of the cross-sectional shapes of said shaped passageway and said die outlet are geometrically similar to the cross-sectional shape of said substrate.

7. The process of claim 1, wherein the cross-sectional shapes of said shaped passageway and said die outlet are congruent.

8. The process of claim 1, wherein the residence time of said coated substrate in said shaped passageway is at least about 0.5 seconds and not more than about 2 seconds.

9. The process of claim 1, wherein said introducing of step (a) includes pushing said elongated substrate into a die inlet defined by an inlet wall of said die.

10. The process of claim 1, wherein said insulating member is formed of an insulating material selected from the group consisting of mica and calcium silicate.

11. The process of claim 1, wherein the elongated substrate has an overall length of at least 5 feet.

12. The process of claim 1, wherein said coated substrate is passed through said insulating member along a substantially horizontal axis.

13. The process of claim 1, wherein said process is a continuous process and said elongated substrate passes through said die at a line speed of at least 25 feet per minute.

14. The process of claim 1, wherein said cooling of step (e) is carried out at a pressure of less than about 100 kPa.

15. The process of claim 1, wherein said coating is selected from the group consisting of polyesters, copolyesters, polycarbonates, acrylics, cellulose esters, polyolefins, nylons, polyvinylchloride, and combinations thereof.

16. The process of claim 1, wherein said elongated substrate comprises natural or composite wood or PVC.

17. A process for coating an elongated substrate, said process comprising:
(a) pushing an elongated substrate into an inlet of an extrusion coating die;
(b) passing said elongated substrate through said die along a substantially horizontal die axis;
(c) introducing a coating material into said die;
(d) during at least a portion of said passing, contacting said substrate with said coating material introduced into said die to thereby provide a coated substrate;
(e) removing said coated substrate from said die via a die outlet defined in an outlet wall of said die; and
(f) cooling said coated substrate removed from said die outlet via contact with a quench liquid to thereby provide a cooled, coated substrate, wherein said cooled coated substrate has an average $R_{max}$ surface roughness of less than 30,
prior to said cooling and subsequent to said removing, passing said coated substrate through a shaped passageway defined within an insulating member affixed to at least a portion of a die outlet wall defining said die outlet. where said insulating member has a thermal conductivity less than the thermal conductivity of said die outlet wall,
wherein the minimum distance between the edge of said shaped passageway and the edge of said die outlet is from 1 mil to less than 100 mils.

18. The process of claim 17, wherein the time between said removing of step (d) and said cooling of step (e) is at least about 0.5 seconds and not more than about 5 seconds.

19. The process of claim 17, wherein said insulating member has a thermal conductivity less than the thermal conductivity of said die outlet wall.

20. The process of claim 19, wherein the minimum cross-sectional area of said shaped passageway and the cross-sectional area of said die outlet are within no more than about 25 percent of one another.

21. The process of claim 20, wherein the cross-sectional shape of said shaped passageway and the cross-sectional shape of said die outlet are congruent.

22. The process of claim 17, wherein said elongated substrate comprises natural wood or composite wood or PVC.

23. The process of claim 22, wherein the surface of said cooled coated substrate has less than 10 bubbles per 100 feet.

* * * * *